United States Patent
Roy et al.

(10) Patent No.: US 9,643,324 B1
(45) Date of Patent: May 9, 2017

(54) MULTI-AXIS ROBOT WITH REMOTE DRIVES FACILITATING HAZARDOUS ENERGY ISOLATION FOR USE BY HOME CONSUMERS

(71) Applicants: Shambhu Nath Roy, Fremont, CA (US); Xiaoyi Huang, Union City, CA (US)

(72) Inventors: Shambhu Nath Roy, Fremont, CA (US); Xiaoyi Huang, Union City, CA (US)

(73) Assignee: GOURMEON INC., Roseville, CA (US)

( * ) Notice: Subject to any disclaimer, the term of this patent is extended or adjusted under 35 U.S.C. 154(b) by 0 days.

(21) Appl. No.: 14/925,983

(22) Filed: Oct. 29, 2015

(51) Int. Cl.
  *B25J 9/02* (2006.01)
  *B25J 15/00* (2006.01)
  *B25J 9/12* (2006.01)
  *B25J 5/04* (2006.01)
  *B23Q 1/62* (2006.01)

(52) U.S. Cl.
  CPC .......... *B25J 15/0071* (2013.01); *B23Q 1/626* (2013.01); *B25J 5/04* (2013.01); *B25J 9/023* (2013.01); *B25J 9/12* (2013.01)

(58) Field of Classification Search
  CPC .............. B25J 9/023; B25J 5/04; B23Q 1/626
  See application file for complete search history.

(56) References Cited

U.S. PATENT DOCUMENTS

| | | | |
|---|---|---|---|
| 6,626,630 B1 * | 9/2003 | Lomerson, Jr. .......... | B25J 9/023 414/749.1 |
| 7,189,049 B1 * | 3/2007 | Blomgren ................ | B25J 9/023 414/751.1 |
| 8,973,768 B1 | 3/2015 | Jung | |
| 9,131,807 B2 | 9/2015 | Roy | |
| 2008/0064543 A1 * | 3/2008 | Taguchi ................... | B25J 9/023 474/8 |
| 2012/0328404 A1 * | 12/2012 | Froelich ..................... | B25J 5/04 414/749.1 |

* cited by examiner

*Primary Examiner* — Gerald McClain (57) ABSTRACT

A modular robot mechanism utilizing fixed drives, power sources, power delivery cables and electrical components for 4 or more axes in a protective enclosure while making it possible to provide spatial positioning and tilting degrees of freedom to an end effector suitable for using in a consumer product. Furthermore a robotic head mechanism is disclosed that creates additional degrees of freedom or states by combination of existing axes with spring loaded lock mechanisms eliminating need for conventional electrically actuated solenoid or pneumatic grippers making it possible for use as a home appliance. A method to control the robot mechanism and additional axis utilizing a matrix to decouple the input position to the remote actuator and Cartesian motion produced at the end effector.

19 Claims, 10 Drawing Sheets

MULTI-AXIS ROBOT WITH REMOTE DRIVES FACILITATING HAZARDOUS ENERGY ISOLATION FOR USE BY HOME CONSUMERS

BACKGROUND OF THE INVENTION

The present invention generally relates to a robotic mechanism for use in an apparatus for preparing dishes using recipe steps and cooking conditions coded as a computer program recipe executed by a kitchen top robotic cooking machine supplied with the required ingredients with minimal user intervention while adjusting recipe to tastes of the user.

A need exists for a robotic mechanism for use in automated home cooking machines as disclosed in U.S. Pat. No. 9,131,807. Gantry robots with three or more axes disclosed in prior art such as U.S. Pat. No. 8,973,768 are serial mechanism and each axis carries the next one. The first gantry axis such as x-axis is driven by an actuator in combination with a linear motion device such as ball screw driven by a motor or integrated as in a linear motor, the actuator and motion elements for the second axis such as y-axis are mounted onto the first axis or x-axis and all elements of the y-axis move along x-axis, further more a third axis such as a z-axis is made possible by similar actuator and linear motion devices by attaching them to the y-axis firmly. So for any x-motion the actuators and mechanism for y and z axis move along x-axis and for any y-axis motion all elements of z-axis move along the y-direction. So only the motor for first axis is stationary and the rest of the actuators or motors are in constant motion. This requires all the power cables and encoder feedbacks cables are carried as well and flexible to allow changing shapes due to changing positions between connected cable ends. Constant motion can cause cables and motors to fail eventually and increasing the cost with reduced reliability.

Further the user can be exposed to the hazardous voltages being carried to the second and third motors by fatigue failure of cable insulations due to stress fatigue or attack from corrosive elements in workspace. Cable design and management is a very critical aspect of such robotic mechanisms. Having to carry secondary axes also creates additional force and strength requirement from the primary axes requiring overdesign for primary axes.

A need exists for a robot that is able to meet the needs of a cooking machine that is used in a harsh environment as in the case of household cooking where the robot mechanism is exposed to various unsuitable conditions such as heat, moisture, grease, fumes, acids and bases. Further the robot needs to be reliable for use for long periods of times without requiring any servicing in a home user environment as compared to an industrial environment where regular daily, weekly, monthly and annual preventive maintenance and inspections are common. The robot also needs to be safe for average users not familiar with industrial machinery. The robot needs to be able to carry weights ranging from light to relatively heavy for its size. Electrical cables and connections should not be exposed to cooking environment such as high temperatures, moisture, fumes, grease and other particulate material as this can cause their gradual degradation as well as electrical shock and fire hazards caused by compromised insulation. Furthermore an industrial robot with cables and motors moving around are not a welcome sight for a consumer device.

Further a need exists for a robot that has positioning precision suitable for a consumer application for home cooking by transporting ingredients and intermediates efficiently but cost effective at the same time. The positioning accuracy and overall functionally should not be impacted by the operating conditions such as temperatures and moisture. The robot mechanism must be compact to be able to fit in a conventional kitchen and of comparable size to a home appliance. The robot also needs to provide continuous operation without need for periodic servicing as in case of industrial robots. The robot should have safety features to coexist with members of a household including children. The robot mechanism should allow it to be design compatible with government food preparation and health standards and keep industrial machinery components such as lubricants, hazardous design materials away from the operation area.

A need therefore exists to provide a robot that can be used for a consumer food preparation device which can survive the harsh conditions over long periods of time. The electrical systems and drives can be located such that they are remote from the food preparation areas and are not accessible to the user. There are no moving cables or electrical power delivery components including electrical connections exposed to the cooking environment. The electrical systems and drives are safety isolated from the average customer but can be accessed and serviced by qualified technicians. The robot mechanism providing a large number or controlled degrees of freedom as needed for three dimensional positioning, tilting and gripping utilizing fewer motors and controlled axis to be cost effective for a consumer application.

BRIEF SUMMARY OF THE INVENTION

The present invention provides a robot mechanism utilizing fixed drives, power sources, power delivery cables and electrical components for four or more axes in a protective enclosure while making it possible to provide spatial positioning and tilting degrees of freedom to an end effector such as an ingredient container being moved to a cooking pot.

An object of the invention is to provide a three or more axes robotic mechanism that has source of motion actuators such as electric motors remotely located with respect to the robot workspace and stationary. All such fixed motors are powered by cables and other motion elements that do not move with the end effector or impacted by the work environment. Another object of the invention is to have all the actuator motors and supporting elements located safely in a protective enclosure allowing placing such a device for home use by average consumers not trained to be around industrial robots.

According to an embodiment of the invention the actuator motors are connected to the corresponding axes by means of a pulley and belt arrangements such that the belt pulley mechanisms for each axes are stacked spatially. Furthermore a robotic head mechanism is disclosed that creates additional degrees of freedom or states by combination of existing axes with spring loaded lock mechanisms eliminating need for conventional electrically actuated solenoid or pneumatic grippers. Further it allows actuator resource sharing such as electronic or PLC robot controllers the cost of which is proportional to the number of degrees of freedom.

Yet another object of the invention is to use restoring forces such as spring in substantially orthogonal direction clasping on a universal lift component that or features of which are part of any target object to be picked and tilted. Once the target object is picked it is secured well enough to even allow contents to be disposed by tilting to an upside down position of the target object such as a raw ingredient basket.

A further object of the invention is to amplify the tilt of the end effector robot head by means of gears or other mechanical rotation multiplication devices as known in the art.

A further object is to be able to wash down parts of the robot mechanism exposed to the workspace area that can cause it to be contaminated requiring cleaning as per food preparation equipment codes as well as need reduced periodic maintenance.

Additional features and advantages of the present invention are described in, and will be apparent from, the detailed description of the preferred embodiments and from the drawings.

BRIEF DESCRIPTION OF THE SEVERAL VIEWS OF THE DRAWING

The following is a description, by way of example only, of different embodiments of the mechanism, its variations, derivations and reductions.

DETAILED DESCRIPTION OF THE INVENTION

Figure 1:
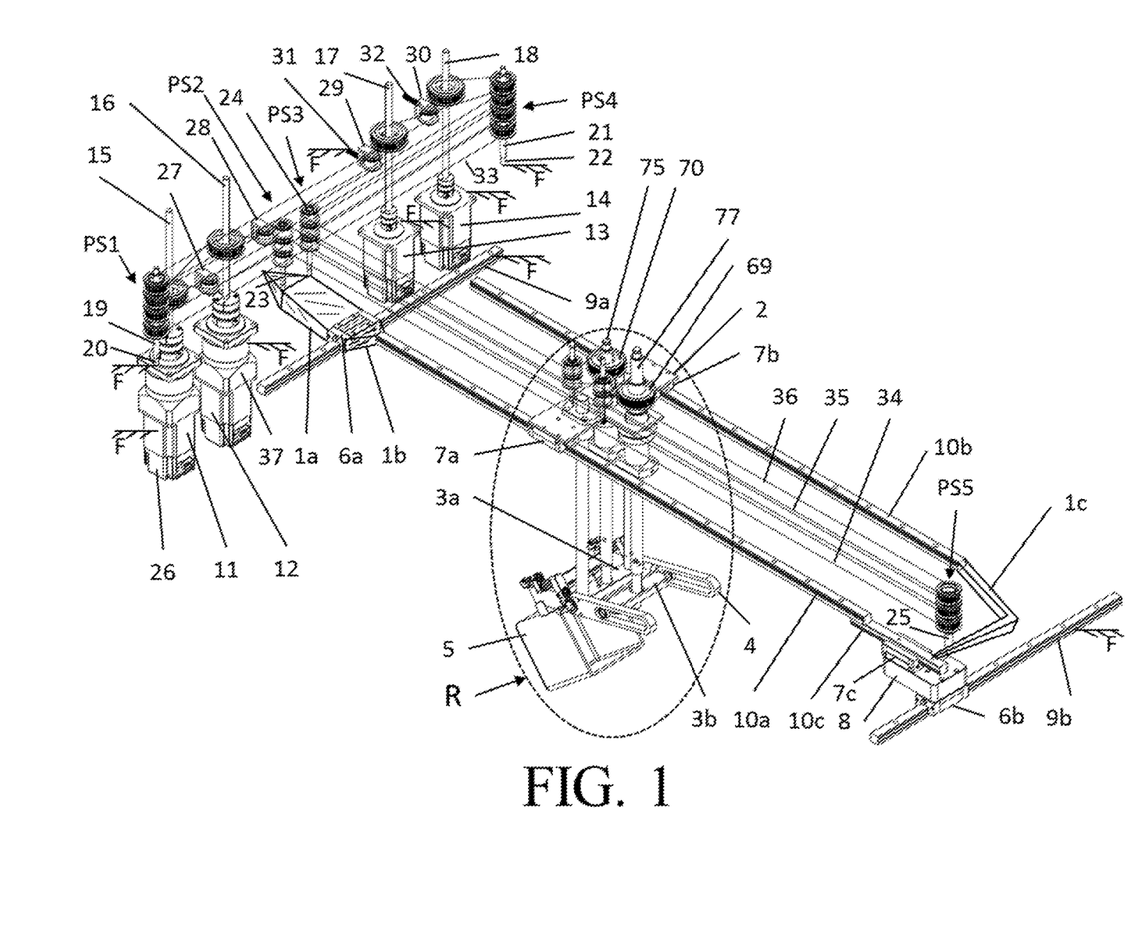
FIG. 1 shows a 4-axis robot moving an ingredient basket along X, Y and Z axes as shown in supporting FIG. 1b while tilting along T-axis as shown in supporting FIG. 1b with T-axis parallel to and offset from Y-axis driven by fixed motors and pulley stacks.
Figure 1B:
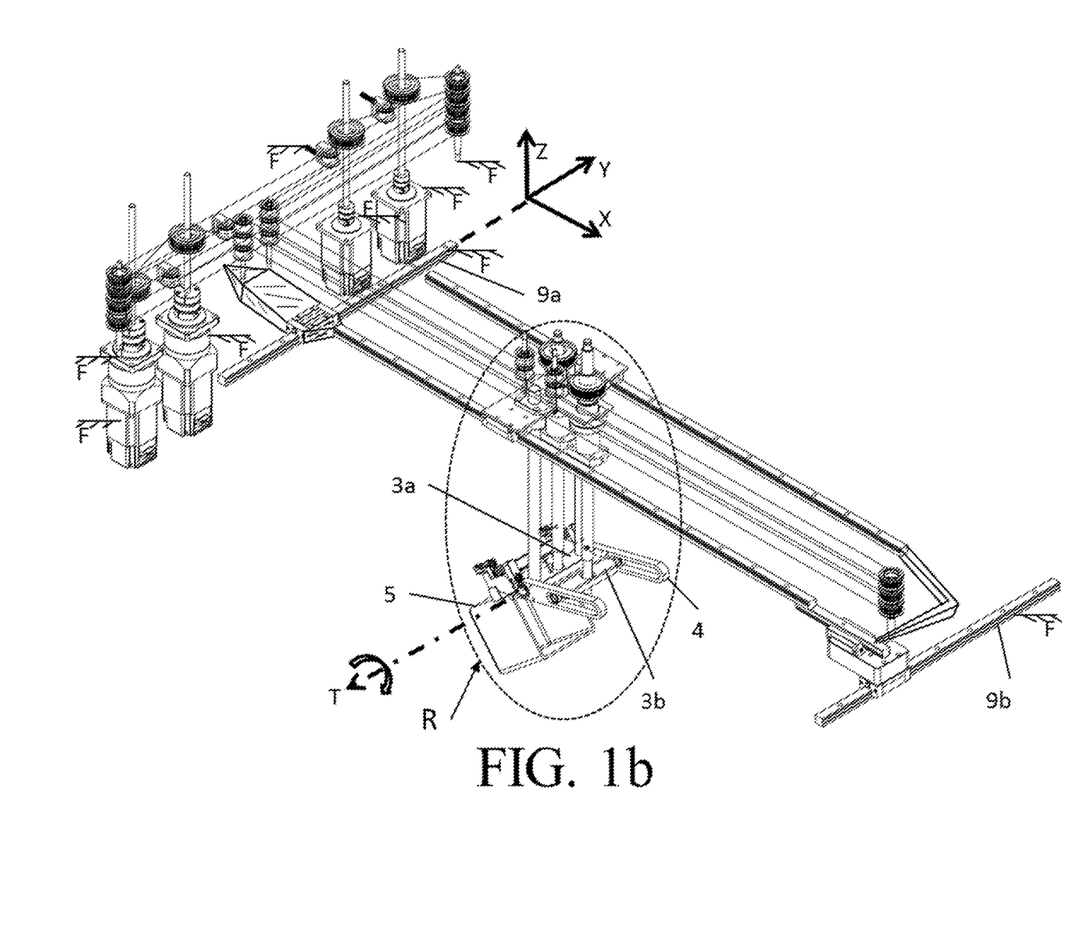

Now referring to the drawings, wherein like numerals designate like components, FIG. 1 shows a four axis gantry robot mechanism comprising a robot head assembly R moving a target object such as raw ingredients basket or container 5 along translating axes X, Y, Z as shown in supporting FIG. 1b and tilting about tilt axis T as shown in supporting FIG. 1b. A target object or container 5 has 4 degrees of freedom controlled by stationary remote motors 11, 12, 13 and 14. Motors 11, 12, 13 and 14 are mounted to a fixed frame F. The motors mounting can be substantially rigid or based on the application environment has spring and dampers to isolate vibration as known in the art. The fixed frame F also acts as a protective enclosure, not fully shown for clarity, the motors and other components are contained within to limit access to only trained personnel with safety interlocks that can trip or turn off power as needed. The motors also have integrated encoder and controller interphase 26 that are connected to motor drivers and controllers.

The robot head assembly R is mounted using a linear guide rail mechanism to y-axis guide rail 10a by a x-axis linear motion guide block 7a secured to robot head assembly base 2 such that the robot head assembly R can move along x-axis guide rail 10a. An additional linear motion x-axis guide block 7b along with an additional x-axis guide rail 10b parallel to x-axis guide rail 10a is used for added strength to allow use of smaller size linear motion components with larger payloads. A third x-axis rail guide rail 10c is fixed to x-axis guide rail 10a and x-axis guide rail 10b using a x-axis base member 1c such that the x-axis linear motion guide rails 10a, 10b, 10c are parallel and do not move relative to each other or the x-axis base member 1c. The x-axis guide rail 10a is secured to y-axis linear motion block 6a which can move onto the y-axis linear motion guide rail 9a fixed to the frame F. The y-axis linear motion guide block 6a is secured to x-axis base member 1a such that all x-axis motion parts 1a, 1b, 1c, 10a, 10b, 10c move together along y-axis guide rail 9a while carrying the robot head assembly R along x-axis as well.

An additional y-axis guide rail 9b, also fixed to frame F is used to provide additional support to the x-axis base members 1a, 1b, 1c and linear motion guide members by mounting them to the additional y-axis guide rail 9b using an additional y-axis linear motion block 6b through x-axis secondary base member 8 and x-axis secondary linear motion guide 7c. The x-axis linear motion members could be directly mounted by securing x-axis linear motion guide rail 10a, 10b or 10c directly to x-axis secondary base member 8 eliminating linear motion guide 7c as well, but that would cause stress and failure due to thermal environments causing expansion of x-axis guide rails with y-axis guide rails fixed to frame F. Having a secondary x-axis linear motion guide block 7c in series allows this new mechanisms to eliminate any operational failure conditions due to thermal expansion or contractions.

The robot head assembly base 2 has two controllable degrees of freedom one each along horizontal axes X and Y. The robot head assembly comprises of a first translating link 3a which moves along the axes X, Y same as robot head assembly base 2 but possesses a third controlled degree of freedom to move along a vertical z-axis as will be explained further referring to FIGS. 3a and 3b. The robot head assembly further comprises of a second translating link 3b also with three controlled degrees of freedom and an end effector link 4 having four controlled degrees of freedom to be explained further referring to FIGS. 3a and 3b. The said two, three and four degrees of freedom of end effector link 4 are controlled by motors 11, 12, 13, 14 driving respective motor shafts 15, 16, 17, 18 through motion transmission pulley stacks PS1, PS4 mounted to frame F by shafts 19, 21 fixed at ends 20, 22 respectively; pulley stacks PS3, PS4, PS5 mounted to y-axis frame member 1a by fixed shafts 23, 24, 25 respectively, pulley belts 33, 34, 35, 36, ball screw nut driver pulleys 69, 70, ball screw shafts 75, 77 and idler tensioner pulleys mounted on supports 27, 28, 29, 30. A gearbox 37 is used for motor 12 to increase torque. The end effector link 4 uses these four degrees of freedom to manipulate ingredient basket or container 5 by attaching to itself.

Figure 2A:
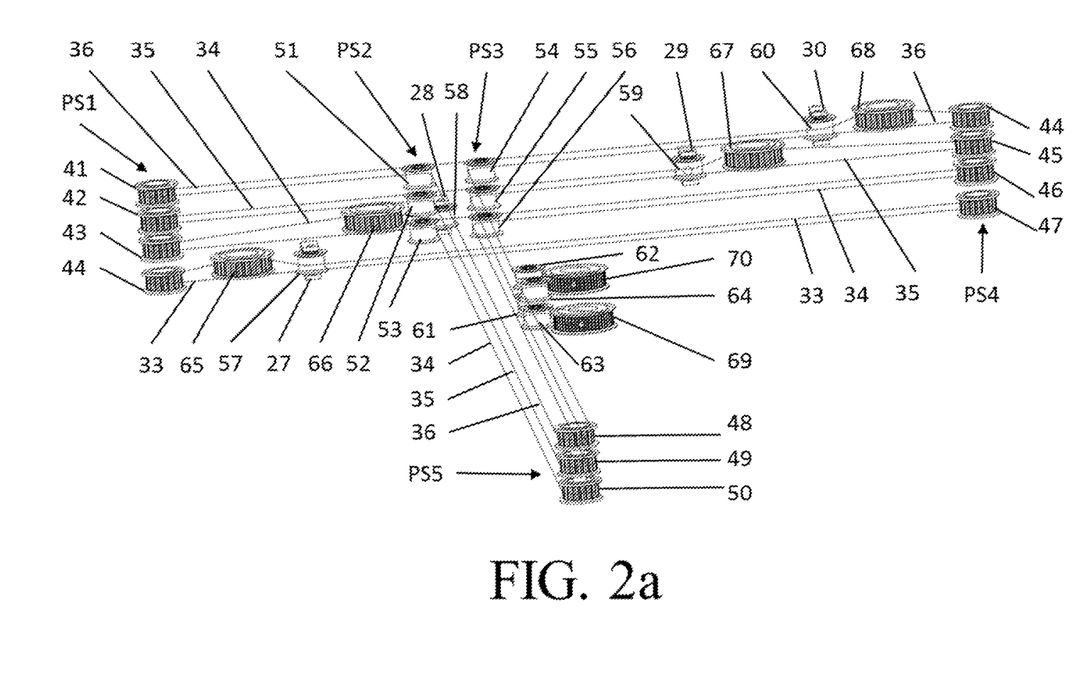
FIG. 2a shows a detailed 3D view of the pulley stacks for X, Y, Z and T axes.
Figure 2B:
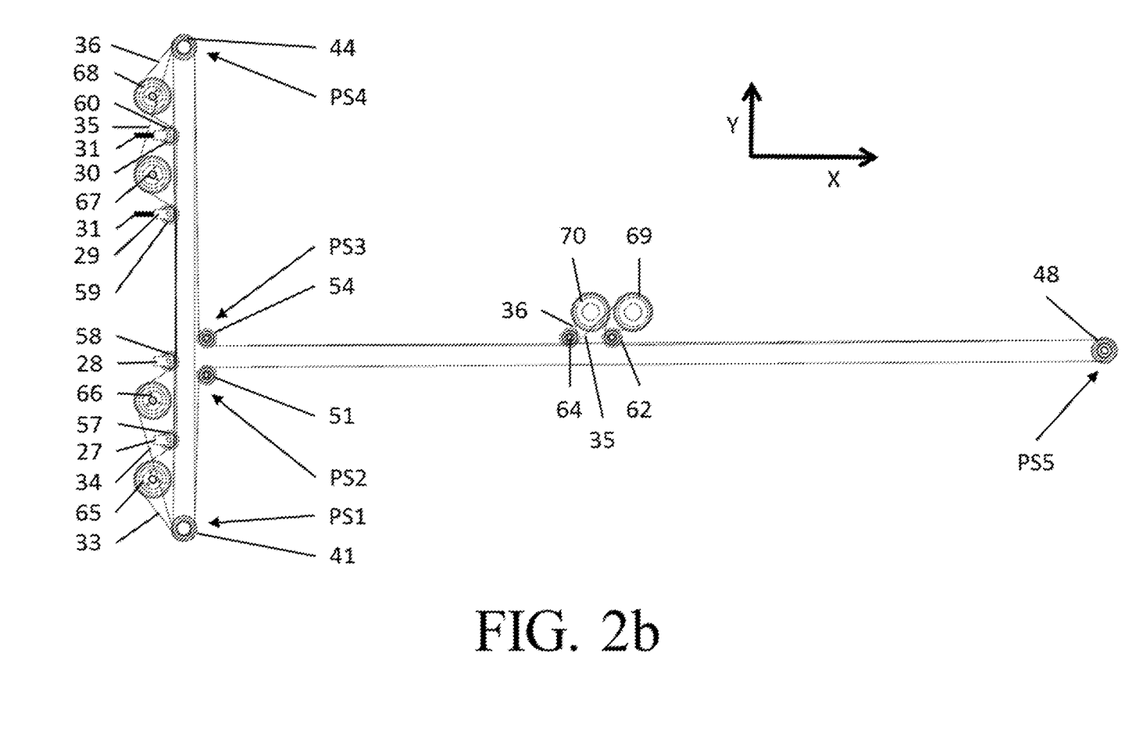
FIG. 2b shows a detailed top view of the pulley stacks for X, Y, Z and T axes.

FIG. 2a is a three dimensional view and FIG. 2b. a top view, both illustrating the motion transmission elements of the four axis gantry robot mechanism shown in FIG. 1 in detail. Y-axis drive pulley 65 is mounted onto shaft 15 (referring back to FIG. 1) which is driven by motor 11. Y-axis drive pulley 65 drives a y-axis drive belt 33 that loops around over y-axis idler near pulley 44 of pulley stack PS1, y-axis idler far pulley of pulley stack PS4 and pushed by y-axis idler tensioner pulley 57 mounted on support 27. Since all the pulley and idler elements remain at rest with respect to frame F the drive belt 33 loop around length is constant regardless of the pulley motion or for any position. Referring back to FIG. 1, y-axis belt 33 is attached to x-axis base member 1a and so any rotation of y-axis motor 11 causes all the x-axis base members 1a, 1b, 1c, guide rails 10a, 10b, 10c and any subsequent members attached to them including robot head assembly R to translate along y-axis. The members 33, 65, 44, 47 and 57 together make a y-axis motion transmission layer.

Further, looking at FIGS. 2a and 2b, X-axis drive pulley 66 is mounted on shaft 16 (referring back to FIG. 1) which is driven by driven by gearbox 37 using motor 12. X-axis drive pulley 66 drives a x-axis belt 34 that loops over around x-axis idler near pulley 43 of pulley stack PS1, x-axis idler y-intermediate near pulley 53 of pulley stack PS2, x-axis idler end pulley 50 of pulley stack PS5, x-axis idler y-intermediate far pulley 56 of pulley stack PS3, x-axis idler far pulley 46 of pulley stack PS4 and x-axis tensioner pulley 58 mounted on support 28. With pulley stacks PS1, PS4 are rotatable mounted to stationary frame F and pulley stacks PS2, PS3, PS5 rotatable mounted to x-axis base members and so moving along y-axis the closed loop around length of x-axis pulley belt 34 is maintained same regardless of pulley motion due to the reduction or increase in distance between pulley stacks PS1, PS2 being compensated by an opposite increase or reduction in pulley stacks PS3, PS4. Referring back to FIG. 1, x-axis pulley belt 34 is attached to robot head assembly base 2 such that a rotation caused by motor 12 will result in a translation of robot head assembly R along x-axis However due to this arrangement there are interactions between y-axis motor causing x-axis motion of robot head assembly even when x-axis motor is not rotating and vice versa. So if a motion in either x-axis or y-axis is desired then the other motor has to move in opposite direction to nullify this effect. This means there is a transfer matrix between motor x-axis and y-axis motion rotation and subsequent linear translation seen along x-axis and y-axis for robot head assembly R. The members 34, 43, 53, 50, 56 and 58 together make x-axis motion transmission layer.

Even further, looking at FIGS. 2a and 2b two additional z-axis and tilt-axis transmission layers are formed similar to the x-axis transmission layer. The z-axis transmission layer is made of z-axis belt 35, z-axis drive pulley 67, z-axis idler pulley 59, z-axis idler near pulley 42, z-axis idler y-intermediate near pulley 52, z-axis idler end pulley 49, z-axis secondary far idler pulley 63, z-axis ball screw nut driver pulley 70, z-axis secondary near idler pulley 61, z-axis idler intermediate far pulley 55 and z-axis idler far pulley 45. As will be explained in detail further referring to additional figures pulleys 63, 69, 61 are all fixed in position on robot head assembly base member and do not suffer from any relative translation motion such that the z-axis belt length changes between pulleys 49, 63 are compensated by equal and opposite change between pulleys 61, 59.

Similar to z-axis transmission layer, the tilt-axis transmission layer is made of tilt-axis belt 36, tilt-axis drive pulley 68, tilt-axis idler pulley 60, tilt-axis idler near pulley 41, tilt-axis idler y-intermediate near pulley 51, tilt-axis idler end pulley 48, tilt-axis secondary idler far pulley 62, tilt-axis ball screw nut driver pulley 69, tilt-axis secondary near idler pulley 64, tilt-axis idler intermediate far pulley 54 and tilt-axis idler far pulley 44. As will be explained in detail further referring to additional figures pulleys 62, 70, 64 are all fixed in position on robot head assembly base member and do not suffer from any relative translation motion such that the tilt-axis belt 36 length changes between pulleys 49, 63 are compensated by equal and opposite change between pulleys 61, 59. Similar to the interactions between x-axis and y-axis motor rotations versus robot head translations, the z-axis and tilt-axis are also impacted. In fact due to this stationary motor arrangement controlling the end effector member 4 via the four transmission layer a four rows by four columns translation matrix exists between the rotations of motors and the motion produced along x, y, z and tilt axes. In another embodiment the pulley and belt transmission are substituted with a pair of ball screws connected via a worm gear mechanism.

Figure 3A:
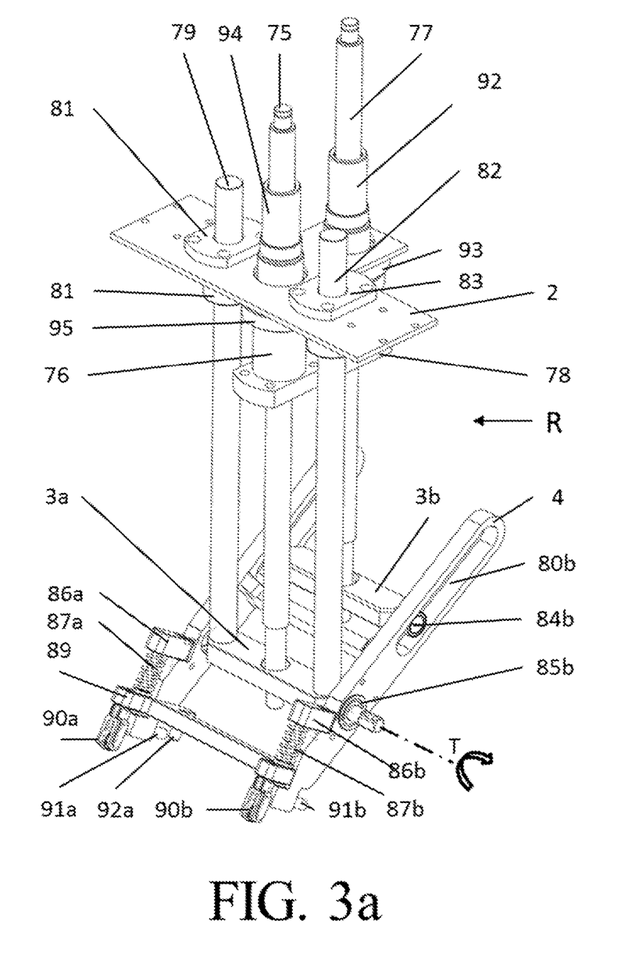
FIG. 3a shows a detailed view of robot head assembly along with Z and Tilt mechanism.
Figure 3B:
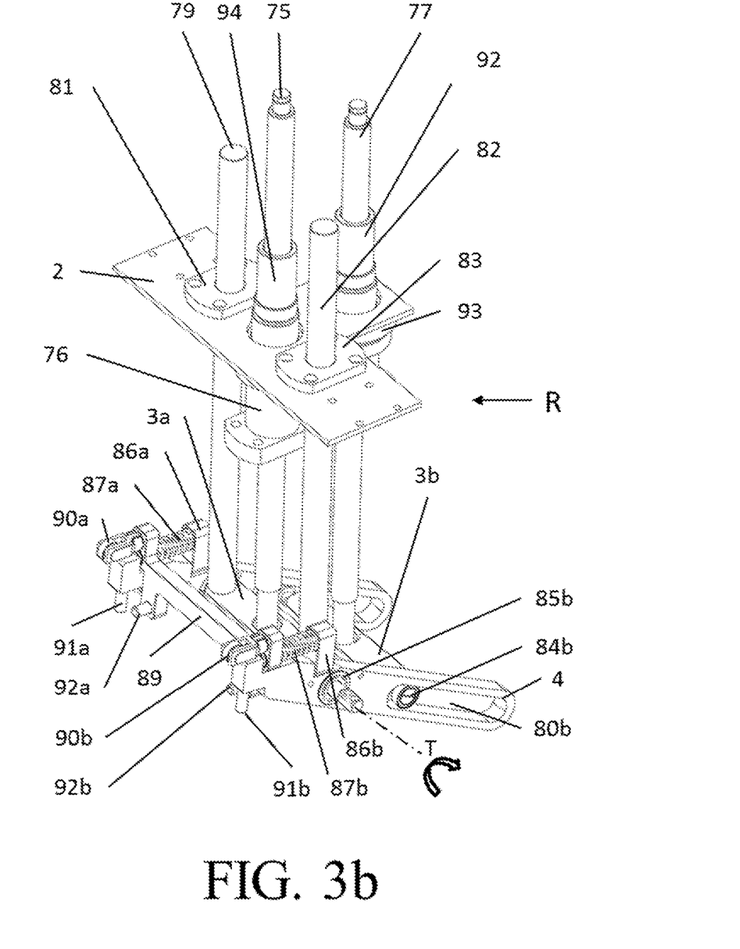
FIG. 3b shows a detailed view of robot head assembly along with Z and Tilt mechanism in a different position and tilt angle.

FIGS. 3a and 3b illustrate the mechanism to convert the rotation of z-axis ball screw nut driver pulley 70 attached to a z-axis ball screw nut 76 connected with a z-axis hollow shaft 94 supported on robot head base assembly 2 by z-axis bearing 95 and into vertical motion of first translating link 3a fixed onto z-axis ball screw shaft 75 along z-axis. Further the rotation of tilt-axis ball screw nut driver pulley 69 attached to a tilt-axis ball screw nut 78 connected with a tilt-axis hollow shaft 92 supported on robot head base assembly 2 by tilt-axis bearing 93 and into vertical motion of second translating link 3b fixed onto tilt-axis ball screw shaft 77. The end effector link 4 is connected to first translating link by a hinge joint using bearings 85a and 85b on each side and connected to the second translating link 3b by a sliding joint using bearings made by slots 80a, 80b on the end effector link 4 and bearings 84a, 84b mounted on second translating link 3b. Each of the first translating link 3a and second translating link 3b have an independent degree of freedom relative to robot assembly base 2 controlled by motors 13, 14 allowing them to be independently positioned along z-axis. This independent positioning capability of the first translating link 3a and second translating link 3b is converted into a z-axis and a tilt position of end effector link 4. FIG. 3b when compared to FIG. 3a shows two different z-axis and tilt positions for end effector link 4 with respect to robot assembly base 2.

Further referring to FIG. 3a and FIG. 3b, a first linear guide shaft assembly comprised of linear guide shaft 79, linear guide bearing 81 connects first translating link assembly 3a to robot assembly base 2 for added strength for moments in all directions properly constraining first translating link 3a to move along z-axis only with respect to robot assembly base 2. A second linear guide shaft assembly comprised of linear guide shaft 82, linear guide bearing 83 connects first translating link assembly 3a to robot assembly base 2 for even more added mechanical strength.

Continuing to refer to FIG. 3a and FIG. 3b, a locking assembly mechanism is shown comprised of first locking pins 91a, 91b mounted on end effector link 4, second locking pins 92a and 92b mounted on locking plate 89 supported on end effector link 4 by locking plate guide shaft spring assembly 87a, 87b fixed to guide shaft mounts 86a, 86b attached onto end effector link 4. Locking plate 89 is able to move along the locking plate guide shaft spring assembly 86a, 86b when pushed by locking plate guide rollers 90a, 90b away from the end effector link 4 along the guide shaft spring assembly 87a, 87b. When no force is applied the locking plate 89 maintains continuous contact to the mating surface on the end effector link 4 constrained by the guide shaft spring assembly 87a, 87b restoration forces. The first locking pins and second locking pins are preferably perpendicular to each other.

Figure 4:
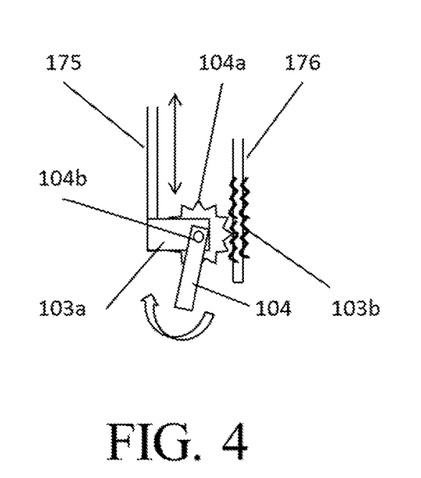
FIG. 4 shows an alternate Z and Tilt mechanism using a worm gear mechanism.

FIG. 4. Illustrates and alternate embodiment with end effector link 104 attached an end effector link gear 104a attached to a z-axis ball screw shaft 175 by hinge joint bearing 104b, the end effector link gear being driven by a worm 103b mounted on a ball screw shaft 176. The end effector link has two controllable degrees of freedom similar to end effector link 4.

Figure 5:
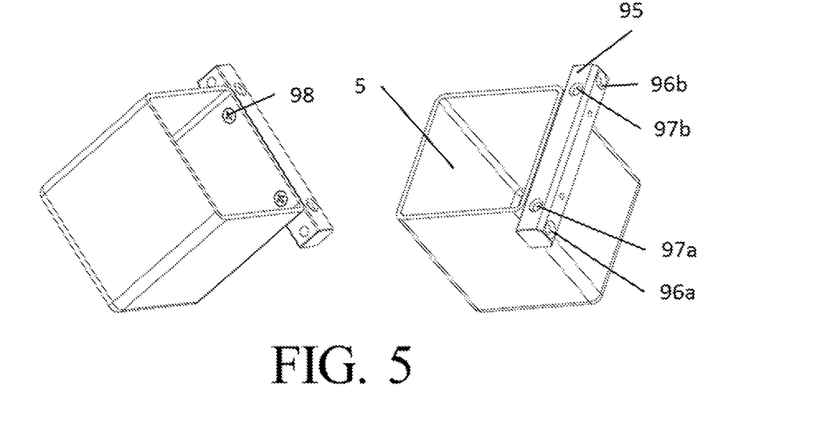
FIG. 5 shows a universal lift bar attached to an ingredient basket.
Figure 6A:
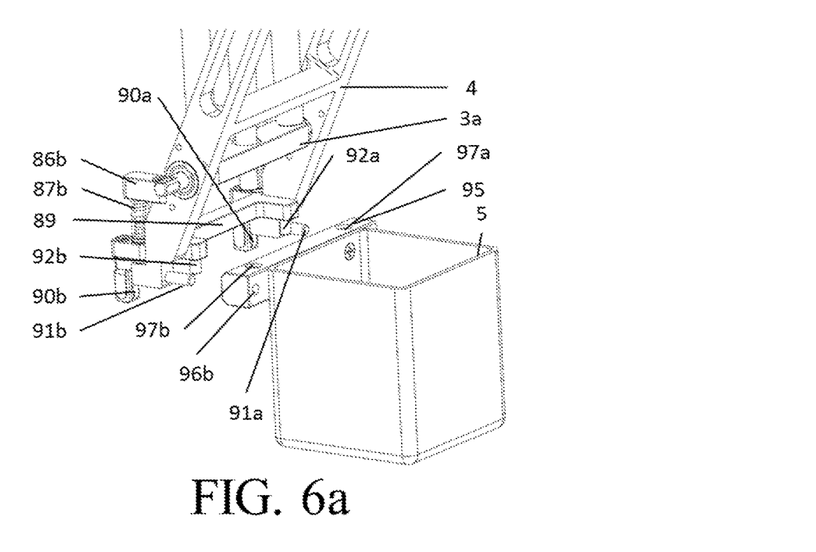
FIG. 6a shows robot head in a position ready to pick an ingredient basket
Figure 6B:
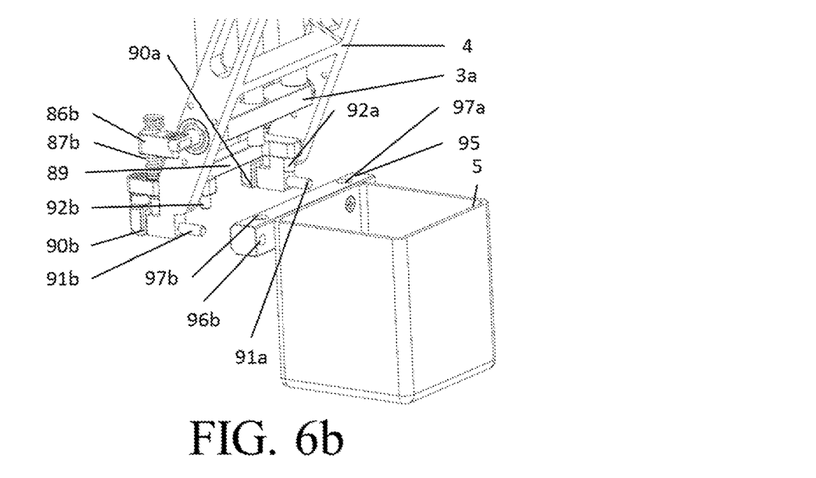
FIG. 6b shows robot head in a position ready to engage the horizontal lock pins to the corresponding universal lift bar lock holes to attached to the ingredient basket
Figure 6C:
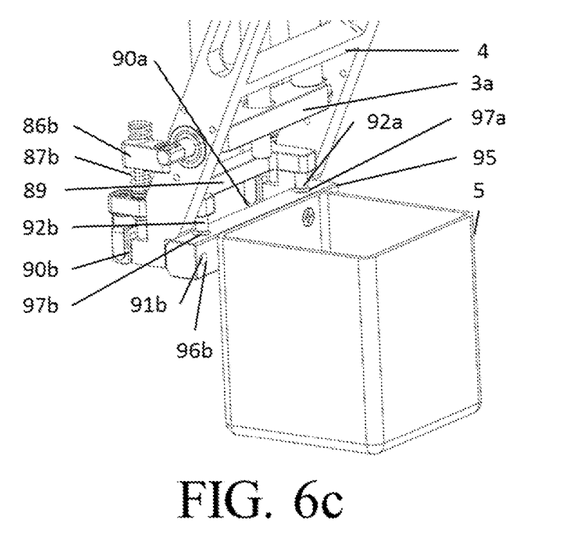
FIG. 6c shows robot head in a position with horizontal lock pins already engaged and ready to lock with the vertical lock pins aligned to corresponding universal bar lock holes attached to the ingredient basket.
Figure 6D:
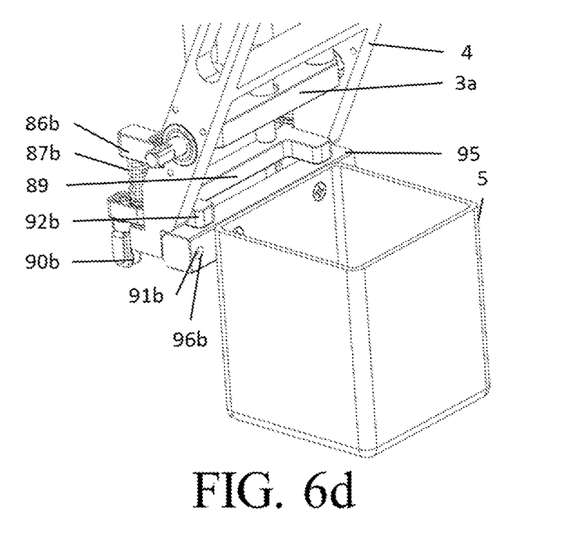
FIG. 6d shows robot head in a position with the ingredient basket picked up and universal lift bar securely locked to the robot head.

FIG. 5. Shows a universal lift bar 95 attached to ingredient basket 5 using screws 98. The universal lift bar has first lock pin holes 96a, 96b and second lock pin holes 97a, 97b. The first lock pin holes and second lock pin holes are preferably perpendicular to each other. The universal lift bar can be attached to any target object which is intended to be picked up and operated by the robot head assembly R successfully regardless of the target objects shaft or size as illustrated by FIG. 6a, FIG. 6b, FIG. 6c and FIG. 6d depicting a picking sequence. FIG. 6a shows the relative positions for robot head assembly R and universal lift bar 95 such that the first locking pins 91a, 91b are lined up with the first lock pin holes 96a, 96b. However the first locking pins and lock pin holes cannot be engaged due to the second locking pins 92a, 92b coming in the way of universal lift bar 95. FIG. 6b shows the relative positions now with the locking plate guide rollers 90a, 90b running into a base frame surface and pushed up to cause the locking plate 89, second locking pins 92a, 92b to move out of the way. The robot head assembly R can now move towards the universal lift bar 95 and successfully engage the first locking pins 91a, 91b into the first lock pin holes 96a, 96b respectively as seen in FIG. 6c. In this first set of locks engaged the second locking pins 92a, 92b are also aligned up to the second pin holes 97a, 97b. As can be seen in FIG. 6d the robot assembly R moves up allowing the locking plate guide rollers 90a, 90b to go free causing the locking plate guide 89 restored to its normal position resting against the end effector link 4 with the second set of locking pins and lock pin holes engaged as can be seen in FIG. 6d.

The universal link bar 95 and ingredient basket 5 are now fully secured to the robot head assembly R as seen in FIG. 1 or FIG. 6d and will not drop for any position or tilt of the robot head assembly R. Utilizing this locking mechanism by reuse of the four degrees of freedom of the robot head assembly along with motion restoring components eliminates the need to use additional motorized, solenoid or pneumatic grippers and any resources such additional electrical or pneumatic power sources, controls for such gripping devices. It also eliminated cables or pneumatic lines to be routed, connected and carried by the robot head assembly. This also allows wash down capability for the robot head assembly R as needed for food preparation equipment.

Figure 7A:
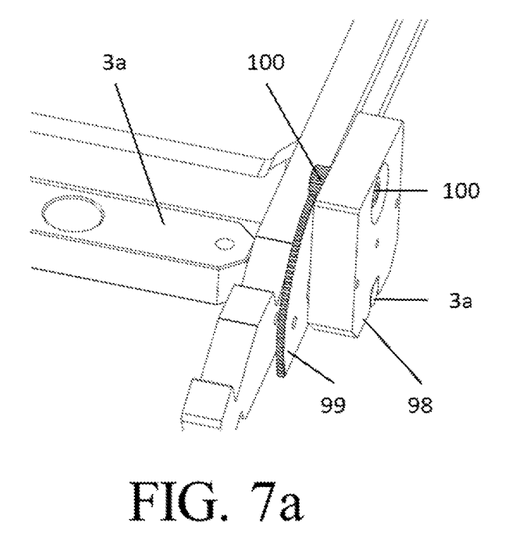
FIG. 7a shows a tilt rotation multiplication means utilizing a gears
Figure 7B:
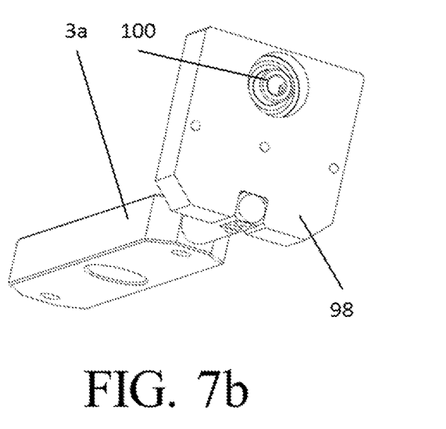
FIG. 7b shows an alternate view of the components of tilt with enhanced rotation.

FIGS. 7a and 7b illustrate a mechanism for enhancing the tilt angle range of end effector link 4 using a secondary end effector link tilt multiplication pinion 100 mounted onto secondary end effector link base 98 using a bearing. The secondary end effector link base 98 is rigidly attached to the first translating link 3a with a tilt multiplication gear 99 rigidly attached to end effector link 4. Any tilt of the end effector link 4 relative to the first translating link 3a causes an enhanced rotation of the secondary end effector link pinion 100 decided by the ratio of teeth of the gear pinion combination.

The end effector link 4 has four degrees of freedom along with additional derived degrees of freedom by use of passive elements and has been sown to be able to pick and transport and ingredient basket 5. The end effector link 4 can also transport other target objects permanently attached of via universal lift bars attached to target objects such as a preferably wireless camera, variation sensors including temperature measurement, air or water delivery jets for cleaning etc.

In another embodiment shaking sequences on end effector link 4 are used for dispensing ingredients out of an ingredient basket or container 5 by generating a shaking sequence by putting any or a combination of input commands to motors 11, 12, 13, 14 for reciprocating rotation at a desired frequency and amplitude.

All though the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A robot mechanism comprising:
at least one end effector link with plurality of degrees of freedom able to move a target object along a first translation axis, a second translation axis, a third translation axis and rotate said target object about a tilt axis;
at least one of said plurality of degrees of freedom chosen from the said second translation axis, said third translation axis and said tilt axis is controlled by a motor attached to a frame; said motor driving a pulley belt assembly stack comprising of a drive belt looping around a drive pulley, an idler near pulley, an intermediate near pulley, an end pulley, an intermediate far pulley and an idler far pulley;
wherein said drive pulley, said idler near pulley, said idler far pulley are rotatable mounted to a said frame; and said intermediate near pulley, said intermediate far pulley and said end pulley are rotatable mounted on a base member that is translating along said first translation axis;
wherein for any position of said base member while translating along said first axis, said drive belt closed loop around length stays same due to the change in the distance between said idler near pulley and intermediate near pulley being compensated by a corresponding opposite change in the distance between the said intermediate far pulley and said idler far pulley;
wherein at least one of the plurality of degrees of freedom chosen from said third translation axis and said tilt axis is controlled by said drive belt further driving a ball screw nut driver pulley placed between a secondary idler near pulley and a secondary idler far pulley;
wherein said ball screw nut driver pulley, said secondary idler near pulley and said secondary idler far pulley are rotatable mounted on a robot head assembly base;
wherein said robot head assembly base moves together with said base member along said first translating axis and moves along said second translation axis independently with respect to said base member;

wherein the said drive belt loop around length stays same for any position of said robot head assembly base position while translating along said first translating axis and said second translating axis due to change in the distance between said secondary idler near pulley and said intermediate near pulley being compensated by a corresponding opposite change in the distance between the said intermediate far pulley and said secondary idler far pulley;

the third axis drive pulley is disposed on a shaft that is rotatably disposed on a third axis drive motor that is disposed on the frame.

2. A mechanism as in claim 1, further comprising:

at least one ball screw nut rotatable mounted onto said robot head assembly base driven by said ball screw nut driver pulley, said ball screw nut rotating around a ball screw shaft attached to a translating link for respective said third translating axis and said tilt axis;

a hinge joint connecting said end effector to said translating link of said third translating axis; and a sliding joint connecting said end effector to said translating link of said tilt axis;

wherein said motors of respective said third translating axis and said tilt axis control position of said end effector along said third translating axis and tilt about said tilt axis.

3. A mechanism as in claim 2, further comprising:

at least one first axis linear guide rail mechanism supporting said base member; and at least one second axis linear guide rail mechanism supporting said robot head assembly;

wherein said first axis linear guide rail mechanism has a first axis linear guide attached to said base member and first axis linear rail attached to said frame facilitating said base member translating along said first axis;

wherein said second axis linear guide rail mechanism has a second axis linear guide attached to said robot head assembly base and second linear rail attached to said base member facilitating said robot head assembly base translating along said second axis.

4. A mechanism according to claim 3, further comprising at least one additional orthogonal linear guide mechanism to support said second axis linear guide to said robot head base assembly to allow for thermal expansions.

5. A mechanism as in claim 2, further comprising:

at least one first axis additional linear guide rail mechanism supporting said base member; and at least one second axis additional linear guide rail mechanism supporting said robot head assembly;

wherein said first axis additional support linear guide rail mechanism is parallel to said first axis linear guide rail mechanism;

wherein said second axis additional support linear guide mechanism is parallel to said second axis linear guide mechanism.

6. A mechanism according to claim 2, further comprising at least one linear guide shaft and bearing assembly connecting said robot assembly base member to said translating link in parallel to said ball screw shaft for additional strength of said end effector.

7. A mechanism according to claim 1, further comprising:

at least one ball screw nut rotatable mounted onto said robot head assembly base driven by said ball screw nut driver pulley of said third translating axis, said ball screw nut rotating around a ball screw shaft attached to a translating link of said third translating axis;

a worm gear attached to said translating link using a hinge joint connecting to said end effector, and;

at least one worm screw attached to said rotating nut of said tilt axis rotatable mounted to robot head assembly base driven by said ball screw nut driver pulley of said tilt axis, said worm screw driving said worm gear;

wherein independent motion of said motors of respective said third translating axis and said tilt axis produce a controlled position of said end effector along said third translating axis and a tilt about said tilt axis.

8. A robot mechanism comprising:

at least one end effector link with plurality of degrees of freedom able to move a target object along a first translation axis, a second translation axis, a third translation axis and rotate said target object about a tilt axis;

at least one of said plurality of degrees of freedom chosen from the said second translation axis, said third translation axis and said tilt axis is controlled by a motor attached to a frame; said motor driving a pulley belt assembly stack comprising of a drive belt looping around a drive pulley, an idler near pulley, an intermediate near pulley, an end pulley, an intermediate far pulley and an idler far pulley;

wherein said drive pulley, said idler near pulley, said idler far pulley are rotatable mounted to a said frame; and said intermediate near pulley, said intermediate far pulley and said end pulley are rotatable mounted on a base member that is translating along said first translation axis;

wherein for any position of said base member while translating along said first axis, said drive belt closed loop around length stays same due to the change in the distance between said idler near pulley and intermediate near pulley being compensated by a corresponding opposite change in the distance between the said intermediate far pulley and said idler far pulley;

wherein at least one of the plurality of degrees of freedom chosen from said third translation axis and said tilt axis is controlled by said drive belt further driving a ball screw nut driver pulley placed between a secondary idler near pulley and a secondary idler far pulley;

wherein said ball screw nut driver pulley, said secondary idler near pulley and said secondary idler far pulley are rotatable mounted on a robot head assembly base;

wherein said robot head assembly base moves together with said base member along said first translating axis and moves along said second translation axis independently with respect to said base member;

wherein the said drive belt loop around length stays same for any position of said robot head assembly base position while translating along said first translating axis and said second translating axis due to change in the distance between said secondary idler near pulley and said intermediate near pulley being compensated by a corresponding opposite change in the distance between the said intermediate far pulley and said secondary idler far pulley;

at least one pick pin attached to said end effector link; and at least one lock plate connected to said end effector link by lock plate guide with position restoring element pushing said lock plate against said end effector link while allowing lock plate to translate in an orthogonal direction to said pick pin axis when an external force is applied to said lock plate;

at least one lock pin attached to said lock plate oriented along said lock plate guide;

at least one pick hole and at least one lock hole on a universal bar lift attached to said target object;

the third axis drive pulley is disposed on a shaft that is rotatably disposed on a third axis drive motor that is disposed on the frame.

9. A mechanism as in claim 8, further comprising;

at least one tilt multiplication gear attached to said end effector;

at least one tilt multiplication pinion rotatable mounted to said translating link;

wherein said tilt multiplication pinion is driven by tilt multiplication gear to cause an enhanced rotation of any said end effector tilt relative to said translating link.

10. A mechanism as in claim 8, further comprising:

at least one ball screw nut rotatable mounted onto said robot head assembly base driven by said ball screw nut driver pulley, said ball screw nut rotating around a ball screw shaft attached to a translating link for respective said third translating axis and said tilt axis;

a hinge joint connecting said end effector to said translating link of said third translating axis; and a sliding joint connecting said end effector to said translating link of said tilt axis;

wherein said motors of respective said third translating axis and said tilt axis control position of said end effector along said third translating axis and tilt about said tilt axis.

11. A mechanism as in claim 8, further comprising:

at least one first axis linear guide rail mechanism supporting said base member; and at least one second axis linear guide rail mechanism supporting said robot head assembly;

wherein said first axis linear guide rail mechanism has a first axis linear guide attached to said base member and first axis linear rail attached to said frame facilitating said base member translating along said first axis;

wherein said second axis linear guide rail mechanism has a second axis linear guide attached to said robot head assembly base and second linear rail attached to said base member facilitating said robot head assembly base translating along said second axis.

12. A mechanism according to claim 11, further comprising at least one additional orthogonal linear guide mechanism to support said second axis linear guide to said robot head base assembly to allow for thermal expansions.

13. A mechanism as in claim 8, further comprising:

at least one first axis additional linear guide rail mechanism supporting said base member; and at least one second axis additional linear guide rail mechanism supporting said robot head assembly;

wherein said first axis additional support linear guide rail mechanism is parallel to said first axis linear guide rail mechanism;

wherein said second axis additional support linear guide mechanism is parallel to said second axis linear guide mechanism.

14. A mechanism according to claim 8, further comprising at least one linear guide shaft and bearing assembly connecting said robot assembly base member to said translating link in parallel to said ball screw shaft for additional strength of said end effector.

15. A mechanism according to claim 8, comprising further a protective enclosure housing said motor, controller and cables remotely protected from harsh work environment.

16. A robot mechanism comprising:

at least one end effector link with plurality of degrees of freedom able to move a target object along a first translation axis, a second translation axis, a third translation axis and rotate said target object about a tilt axis;

at least one of said plurality of degrees of freedom chosen from the said second translation axis, said third translation axis and said tilt axis is controlled by a motor attached to a frame; said motor driving a pulley belt assembly stack comprising of a drive belt looping around a drive pulley, an idler near pulley, an intermediate near pulley, an end pulley, an intermediate far pulley and an idler far pulley;

wherein said drive pulley, said idler near pulley, said idler far pulley are rotatable mounted to a said frame; and said intermediate near pulley, said intermediate far pulley and said end pulley are rotatable mounted on a base member that is translating along said first translation axis;

wherein for any position of said base member while translating along said first axis, said drive belt closed loop around length stays same due to the change in the distance between said idler near pulley and intermediate near pulley being compensated by a corresponding opposite change in the distance between the said intermediate far pulley and said idler far pulley;

wherein at least one of the plurality of degrees of freedom chosen from said third translation axis and said tilt axis is controlled by said drive belt further driving a ball screw nut driver pulley placed between a secondary idler near pulley and a secondary idler far pulley;

wherein said ball screw nut driver pulley, said secondary idler near pulley and said secondary idler far pulley are rotatable mounted on a robot head assembly base;

wherein said robot head assembly base moves together with said base member along said first translating axis and moves along said second translation axis independently with respect to said base member;

wherein the said drive belt loop around length stays same regardless of the position of said robot head assembly base position while translating along said first translating axis and said second translating axis due to change in the distance between said secondary idler near pulley and said intermediate near pulley being compensated by a corresponding opposite change in the distance between the said intermediate far pulley and said secondary idler far pulley;

at least one pick pin attached to said end effector link; and at least one lock plate connected to said end effector link by lock plate guide with position restoring element pushing said lock plate against said end effector link while allowing lock plate to translate in an orthogonal direction to said pick pin axis when an external force is applied to said lock plate;

at least one lock pin attached to said lock plate oriented along said lock plate guide;

at least one pick hole and at least one lock hole on a universal bar lift attached to said target object;

at least one roller attached to said lock plate allowing lock plate to push against a surface with said roller while end effector is moving along said surface, enabling movement of said lock plate away from said end effector plate acting against the restoring element;

the third axis drive pulley is disposed on a shaft that is rotatably disposed on a third axis drive motor that is disposed on the frame.

17. A mechanism according to claim 16 wherein shaking sequences on said end effector link are used generating a shaking sequence by putting input commands to a said motor for reciprocating rotation.

18. A mechanism according to claim 16 able to pick up said target object and lock to said end effector;
- by moving said end effector to a position next to said target object with said pick pin aligned to said pick hole;
- by moving said end effector to a position for said lock plate pushed away from said end effector to clear lock pin out of way of aligned said pick pin and said pick pin hole;
- by moving said end effector to a position to engage said pick pin into respective said pick hole;
- by moving said end effector to align said pick pin to a said pick hole;
- by moving said end effector to a position to release lock plate and engage lock pin in lock hole.

19. A mechanism according to claim 16 able to unlock and release said target object from said end effector;
- by moving said end effector to a position to push lock plate and disengage lock pin from said lock hole;
- by moving said end effector to a position to disengage said pick pin from said pick hole;
- by moving said end effector to a position away from said target object.

* * * * *